United States Patent
Stanford-Clark et al.

(10) Patent No.: US 7,519,717 B2
(45) Date of Patent: Apr. 14, 2009

(54) QUALITY OF SERVICE FOR NETWORK CONNECTED CLIENTS

(75) Inventors: Andrew J Stanford-Clark, Isle of Wight (GB); Philip R Blake, Eastleigh (GB); Stephen Todd, Hants (GB)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 10/596,220

(22) PCT Filed: Dec. 2, 2004

(86) PCT No.: PCT/EP2004/053235
§ 371 (c)(1),
(2), (4) Date: Jun. 5, 2006

(87) PCT Pub. No.: WO2005/055554
PCT Pub. Date: Jun. 16, 2005

(65) Prior Publication Data
US 2007/0100974 A1 May 3, 2007

(30) Foreign Application Priority Data
Dec. 6, 2003 (GB) .................... 0328383.5

(51) Int. Cl.
*G06F 15/16* (2006.01)
(52) U.S. Cl. .................. 709/230; 709/228; 709/227
(58) Field of Classification Search .............. 709/230, 709/221, 203, 220, 228, 223, 227
See application file for complete search history.

(56) References Cited

U.S. PATENT DOCUMENTS

| 6,560,604 | B1 | 5/2003 | Fascenda |
| 7,047,308 | B2 * | 5/2006 | Deshpande .............. 709/232 |
| 7,318,101 | B2 * | 1/2008 | Droms .................. 709/229 |
| 2003/0172270 | A1 | 9/2003 | Newcombe et al. |
| 2004/0203593 | A1 * | 10/2004 | Whelan et al. .......... 455/411 |

FOREIGN PATENT DOCUMENTS

WO  WO02/33539 A2  4/2002

OTHER PUBLICATIONS

Fenger C et al: "The Fantastic Broadband Multimedia System" The Fantastic Corporation, May 31, 2000, XP002258083—The Whole Document.

* cited by examiner

*Primary Examiner*—Salad Abdullahi
*Assistant Examiner*—Madhu Khanna
(74) *Attorney, Agent, or Firm*—Stephen R. Tkacs; Stephen J. Walder, Jr.; Herman Rodriguez

(57) ABSTRACT

A network server for communicating with a network client over a network comprising: a client configuration detector for detecting a configuration of the network client; a server configurator for changing the configuration of the network server; a comparator for determining if the configuration of the network client is compatible with the configuration of the network server; and a server communications component for connecting with the network client using a connection-oriented protocol, wherein the server communications component is operable to disconnect the network client responsive to said comparator.

9 Claims, 4 Drawing Sheets

QUALITY OF SERVICE FOR NETWORK CONNECTED CLIENTS

FIELD OF THE INVENTION

This invention relates to connection-oriented network connections between network clients and a network server. In particular it relates to disconnecting network clients with an incompatible client configuration when a server configuration is changed.

BACKGROUND OF THE INVENTION

Network applications employ network protocols for communication between a network client and a network server. Network protocols can be classified into two main categories: connectionless protocols; and connection-oriented protocols. A connectionless protocol is an asynchronous protocol without a persistent connection between the network client and the network server. For example, a web browser client communicates with a web server using a connectionless protocol known as the hypertext transport protocol (HTTP). Using HTTP, the web browser client can make requests of the web server, such as a request for a particular web page. The web server receives each request as a distinct request which is independent of all other requests, and responds to each request independently. A connection exists between the web browser client and the web server for only as long as it takes to send a request and receive a response. Thus, there is no persistent connection between the web browser client and the web server for multiple requests and responses, and HTTP is therefore considered to be a connectionless protocol.

In contrast, a connection-oriented protocol provides a persistent connection for the transmission of data between a network client and a network server. Connection-oriented protocols also usually include facilities for error, sequence and flow control. Error control refers to a combination of error detection, correction and acknowledgement sufficient to compensate for any unreliability inherent to the network. Sequence control ensures that the network client and the network server are able to reconstruct data received over the network in the proper order in which they were intended to be received, and is essential in the transmission of large volumes of data. Flow control ensures that network clients and network servers do not overrun each other with too much data. An example of a connection-oriented protocol is the transmission control protocol (TCP) which provides these facilities. An application of TCP is video streaming over a network where a streaming video client can create a persistent connection with a streaming video server for the receipt of streaming video data using TCP. The TCP connection is used by the streaming video server to send large streams of video data for receipt by the streaming video client. Other applications of connection-oriented communications include mobile telephone connections to cellular base stations, digital set-top box connections to a digital television service provider and connections between network chat clients such as Lotus Sametime Connect (Lotus is a registered trade mark of International Business Machines Corp.) and AOL Instant Messenger (a registered trade mark of America Online Inc).

Connection-oriented protocols offer effective and reliable communication between network clients and network servers, and support applications requiring long lived connections or connections over which large quantities of data can be transferred A technique for creating a connection-oriented connection between a network client and a network server is outlined below. A network server will include a server configuration comprising one or more server parameters. Similarly, a network client will include a client configuration comprising one or more client parameters. For example, in a streaming video application, a streaming video server may include a server configuration with a video frame rate parameter corresponding to the frame rate of video data streamed from the server. Similarly, a streaming video client may include a client configuration with a maximum frame rate parameter corresponding to a maximum frame rate of video data the client is able to receive. A network client requests a new connection to a network server using the connection-oriented protocol. This can involve an initial message being sent from the network client to the network server with an indication that a new connection is requested. The network server responds to the initial message with a connection acceptance message, including details of the network server configuration. The network client receives the network server configuration and determines if the client configuration is compatible with the server configuration. For example, the server configuration may include a frame rate which exceeds a maximum frame rate of the client configuration, and the network server configuration is therefore incompatible with the network client configuration. If the client configuration is compatible with the server configuration, a connection is created between the network client and the network server. If the client configuration is not compatible with the server configuration, the network client may abandon the request to create a connection.

A server configuration can also be changed during a connection-oriented Network connection, and such a change can affect connected network clients. For example, one or more connected network clients may be incompatible with a new server configuration, such as a new value of a frame rate parameter of a streaming video server. When a server configuration is changed, the network server must determine a course of action for connected network clients. One technique for changing a server configuration involves disconnecting all connected network clients before the server configuration is changed. Network clients are then able to reconnect and determine if the client configuration is compatible with the new server configuration. This technique has the disadvantage that connected network clients which are compatible with a new server configuration are disconnected unnecessarily, and the quality of service provided by the network client is consequently reduced. An alternative technique for changing a server configuration involves only introducing a new server configuration for new connections. Existing connections continue to operate under the original server configuration (i.e. prior to a change to the configuration). This alternative technique has the advantage that existing connected network clients are not disconnected. However, this alternative technique has the disadvantage that the server must Support both an original server configuration for existing connected network clients, and a new server configuration for new network client connections. This can increase the processing requirements of the network server and reduce the performance of the network server. Furthermore, existing connected network clients which support the new server configuration continue to communicate with the server using the original server configuration. This is a particular disadvantage where the new server configuration offers advantages over the original configuration which are to the benefit of existing connected network clients (such as an increase in communications speed).

It would be desirable to provide a way to change a server configuration of a network server with connected network clients without disconnecting the connected network clients which are compatible with the changed server configuration, and without the need for the network server to support multiple server configurations.

SUMMARY OF THE INVENTION

The present invention accordingly provides, in a first aspect, a method for network communication by a network server over a network using a connection-oriented protocol with a network client, wherein the network server has a first server configuration and the network client has a client configuration, the method comprising the step of: detecting the network client configuration; replacing said first server configuration with a second Server configuration; responsive to a determination that the client configuration is incompatibles with the second server configuration, disconnecting the network client.

Thus, the network client is only disconnected from the network server if the client configuration is incompatible with the second server configuration. If the client configuration is compatible with the second server configuration the network connection between the network client and the network server persists using the second server configuration, In this way the server configuration can be changed (from the first server configuration to the second server configuration) without disconnecting the network client when the client configuration is compatible with the new server configuration, and without the need for the network server to support multiple server configuration.

The present invention accordingly provides, in a second aspect, a network server for communicating with a network client over a network comprising: a client configuration detector for detecting a configuration of the network client; a server configuration for changing the configuration of the network server; a comparator for determining if the configuration of the network client is compatible with the configuration of the network server; and a server communication component for connecting with the network client using a connection-oriented protocol, wherein the server communications component is operable to disconnect the network client responsive to said comparator.

The present invention accordingly provides, in a third aspect, a computer program product comprising computer program code stored on a computer readable storage medium which, when executed on a data processing system, instructs the data processing system to carry out the method as described above.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 1:
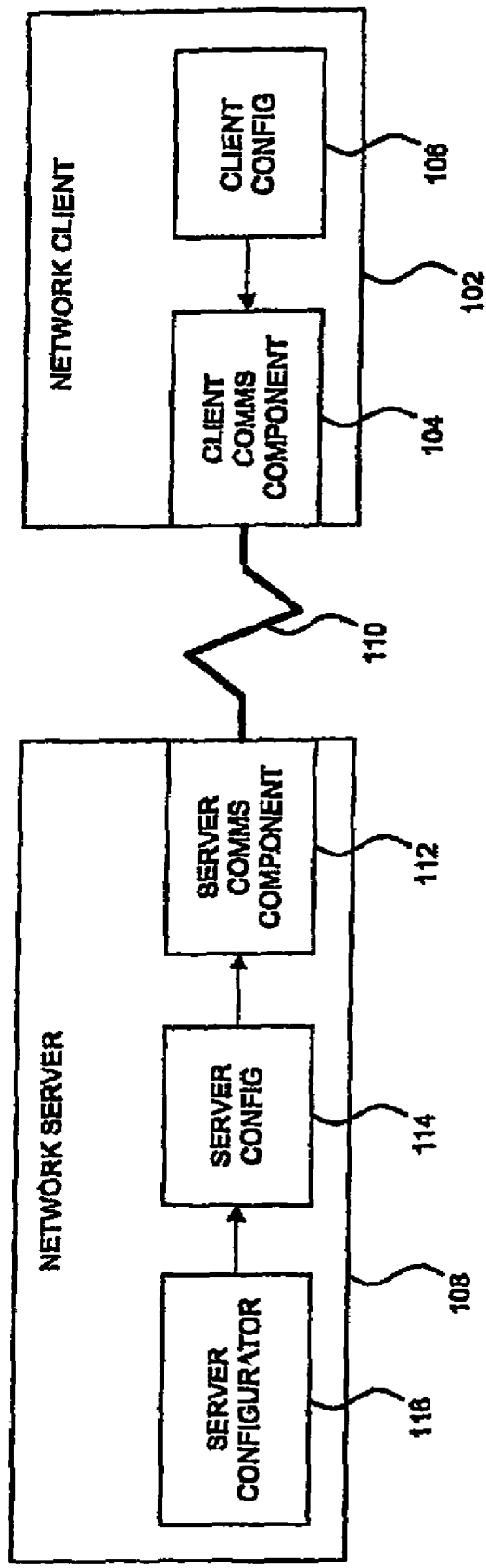
FIG. 1 is a schematic diagram illustrating a network client connected to a network server using a connection-oriented protocol in the prior art.

FIG. 1 is a schematic diagram illustrating a network client connected to a network server using a connection-oriented protocol in the prior art. Network client 102 is a hardware or software implementation of a client component of a network application. For example, the network client 102 is a streaming video network client intended to receive streaming video data. Alternatively, the network client 102 can be a mobile telephone or other wireless communications device, a digital set top box, a computer system including a network interface card (NIC) or any other network connected device.

The network client 102 includes a client communications component 104. The client communications component 104 is a software or hardware component of the network client 102 which provides connection-oriented network connections between the network client 102 and other network devices. For example, the client communications component 104 is a TCP software library, or a software library providing a proprietary connection-oriented network protocol. Network client 102 further includes a client configuration 106. The client configuration 106 is a set of client parameters specific to a particular network application of the network client 102. For example, if the network client 102 is a streaming video network client, the client configuration 106 can include a maximum frame rate parameter corresponding to a maximum frame rate of video data which can be received by the network client 102. Alternatively, the client configuration 106 can include parameters relating to data compression standards, data encryption standards, signal strength requirements, data communications speeds, data communications rates, media encoding standards such as audio or video encoding standards or any other parameter required by the network client 102. Furthermore, the client configuration 106 can include parameters specific to a particular business application, such as financial details (including financial limits), authorisation details (such as access control lists) and business rules. The client configuration 106 is stored in a memory of the network client 102, such as a volatile random access memory, a non-volatile memory or a disk storage device.

The network client 102 is connected to a network server 108 over a network connection 110. The network server 108 is a hardware or software implementation of a server component of a network application. For example, the network server 108 is a streaming video network server for sending streaming video data. Alternatively, the network server 108 can be a mobile telephone or other wireless communications access point, a digital set top box service provider, a computer system including a network interface card (NIC) or any other network connected server device. The network connection 110 is a connection-oriented network connection between the client communications component 104 of the network client 102 and a server communications component 112 of the network server 108. The network connection 110 is implemented using a connection-oriented network protocol. The network connection 110 can be a connection-oriented network connection which operates on a connectionless protocol, with connection-oriented services provided jointly by the client communications component 104 and the server communications component 112. An example of a connection-oriented protocol used by network connection 110 is TCP. The server communications component 112 is a software or hardware component of the network server 108 which provides connection-oriented network connections between the network server 108 and other network devices. The network server 108 further includes a server configuration 114. The server configuration 114 is a set of server parameters specific to a particular network application of the network server 108. For example, if the network server 108 is a streaming video network server, the server configuration 114 can include a frame rate parameter corresponding to a frame rate of video data stream distributed by the network server 108. Alternatively, the server configuration 114 can include any of the parameters described above with respect to the client configuration 106. The server configuration 114 is stored in a memory of the network server 108, such as a volatile random access memory, a non-volatile memory or a magnetic or non-magnetic storage device. The network server 108 further includes a server configurator 116 for changing the server configuration 114. The server configurator 116 can be a hardware or software component of the network server 108, such as a software application providing a user interface for a user to specify a new server configuration 114.

In use, the network client 102 creates the network connection 110 to the network server 108 using a connection-oriented network protocol. The creation of the network connection 110 can involve the client communications component 104 sending an initialization message to the server communications component 112 requesting the creation of a new network connection. In response to the initialisation message, the server communications component 112 provides a response message to the client communications component 104 with details of the server configuration 114. The client communications component 104 receives the details of the server configuration 114 and determines if the client configuration 106 is compatible with the server configuration 114. If the client configuration 106 is compatible with the server configuration 114, the network connection 110 is created between the network client 102 and the network server 108. If the client configuration 106 is not compatible with the server configuration 114, the network client 102 may abandon the request to create the network connection 110. Subsequently, if the network connection 110 is successfully created, the network client 102 is able to send data to, and receive data from, the network server 108 over the network connection 110 using the connection-oriented protocol. Subsequently, when the server configurator 116 changes the server configuration 114, the network client 102 is disconnected by the server communications component 112 which closes the network connection 110. Subsequently, the network client 102 is able to attempt to re-create the network connection 110.

Figure 2:
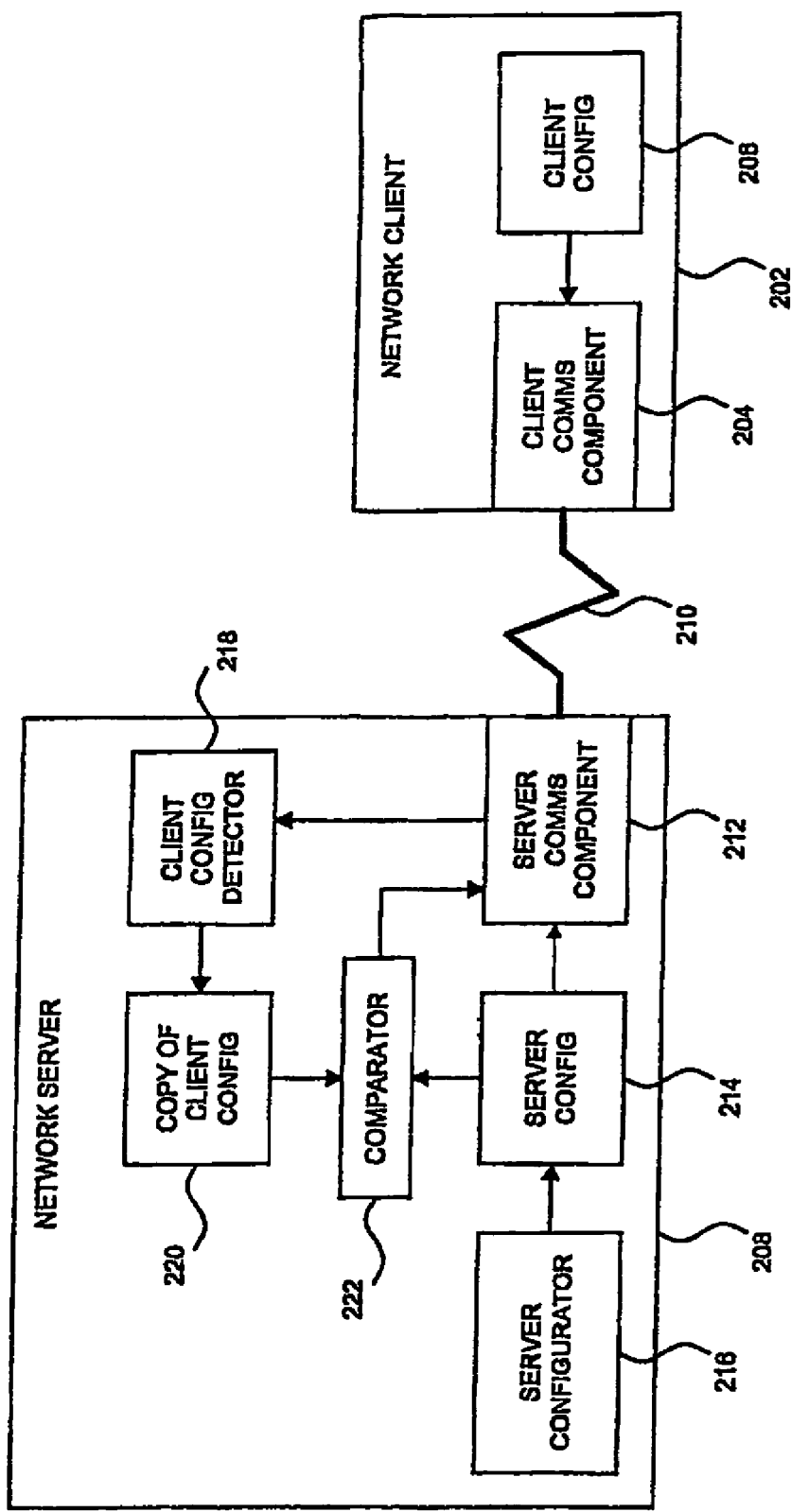
FIG. 2 is a schematic diagram illustrating a network client connected to a network server using a connection-oriented protocol in a preferred embodiment of the present invention.

FIG. 2 is a schematic diagram illustrating a network client connected to a network server using a connection-oriented protocol in a preferred embodiment of the present invention. Many elements of FIG. 2 are identical to those described with respect to FIG. 1 and these will not be further described here in the description of FIG. 2. The network server 208 of FIG. 2 further includes a client configuration detector 218 which detects the client configuration 206 and generates a copy of the client configuration 220. In the preferred embodiment, the client configuration detector 218 is a software module operable to communicate with the server communications component 212 using an application programming interface (API), such as a TCP API. Alternatively, the client configuration detector 218 can be a component of the server communications component 212. The copy of the client configuration 220 is stored in a memory of the network server 208, such as a volatile random access memory, a non-volatile memory or a magnetic or non-magnetic storage device. The copy of the client configuration 220 can be a complete copy of the client configuration 206, or alternatively can be a partial copy of only relevant parameters of client configuration 206. For example, if the network server 208 is a streaming video server, the client configuration detector 218 may only copy parameters of the client configuration 206 which pertain to streaming video. The network server 208 further includes a comparator 222 for comparing the copy of the client configuration 220 and the server configuration 214. In the preferred embodiment the comparator 222 is a software module. The comparator 222 determines if the copy of the client configuration 220 is compatible with the server configuration 214. The results of this determination made by the comparator 222 are used by the server communications component 212.

In use, the network client 202 creates the network connection 210 to the network server 208 using the method of the prior art described with respect to FIG. 1 above. On creation of the network connection 210, the client configuration detector 218 detects the client configuration 206. This detection can be achieved using an API, such as a TCP APL which requests that the server communications component 212 sends a network message to the client communications component 204 requesting details of the client configuration 206. The client communications component 204 subsequently sends details of the client configuration 206 to the server communications component over the network connection 210. Alternatively, the client configuration detector 218 can detect the client configuration 206 by requesting that the server communications component 212 sends "sampling" network messages to the client communications component 204. A response received by the server communications component 212 from the client communications component 204 following these sampling network messages can be used by the client configuration detector 218 to determine the client configuration 206. For example, if the client configuration 206 includes a parameter for a data transfer speed for messages sent by the client communications component 204, the client configuration detector 218 can request that the server communications component 212 sends a sampling message to the client communications component 204, and that the server communications component 212 determines the data transfer speed of a response message sent by the client communications component 204. In this way, the client configuration detector 218 can determine the data transfer speed specified in the client configuration 206. The client configuration detector 218 then creates a copy of the client configuration 220 in a memory of the network server. Subsequently, the server configurator 216 changes the server configuration 214. For example, a value of a parameter in the server configuration 214 is changed to a new value. The comparator 222 then determines if the copy of the client configuration 220 is compatible with the changed server configuration 214. Subsequently, the server communications component 212 disconnects the network client 202 only if the comparator 222 determines that the copy of the client configuration 220 is not compatible with the server configuration 214. Thus, in this way, the network client 202 is only disconnected from the network server 208 if the client configuration 206 is incompatible with a changed server configuration 214.

Figure 3:
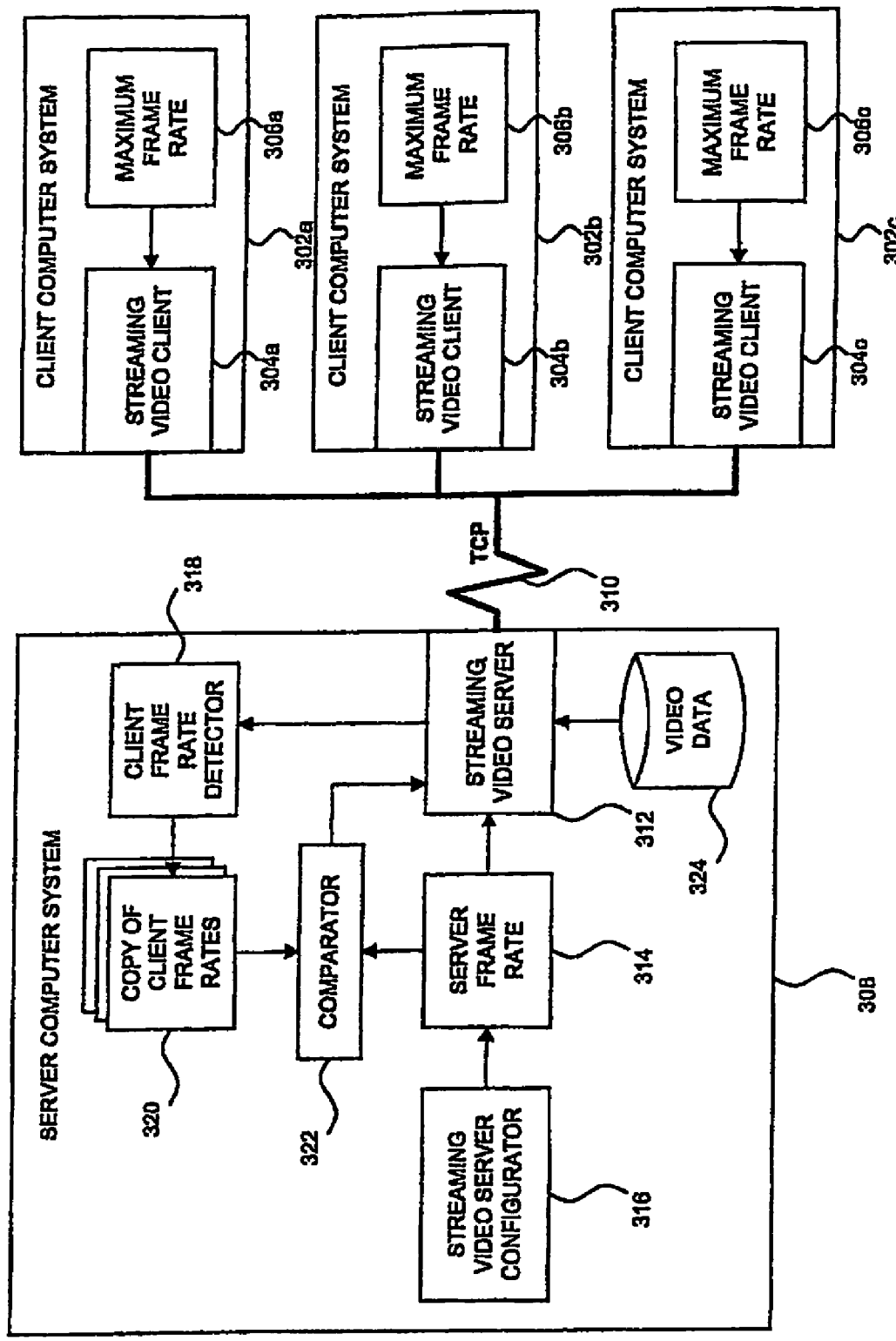
FIG. 3 is a schematic diagram illustrating a client computer system including a streaming video client connected to a server computer system including a streaming video server using the TCP connection-oriented protocol in a preferred embodiment of the present invention.

The preferred embodiment will now be described in use for a streaming video application with reference to FIGS. 3 and 4. FIG. 3 is a schematic diagram illustrating a client computer system including a streaming video client connected to a server computer system including a streaming video server using the TCP connection-oriented protocol in a preferred embodiment of the present invention. The elements of FIG. 3 are specific examples of the elements described with respect to FIG. 2. In particular, FIG. 3 includes three client computer systems 302a, 302b and 302c connected to a server computer system 308 using a TCP network connection 310. Each computer system includes a streaming video client 304, and a maximum frame rate parameter 306. The streaming video client 304 is a communications software module configured to receive a data stream of video data for use by a presentation module (not shown) for displaying the video data on a screen. The streaming video client 304 offers facilities for error, sequence and flow control to ensure the video data arrives without error and in a correct sequence. For example, the streaming video client 304 is Microsoft Media Player (Microsoft is a registered trademark of Microsoft Corporation). The maximum frame rate parameter 306 is a parameter which is assigned a numeric value corresponding to a maximum frame rate of video data which the client computer systems 302 are capable of receiving and displaying. Thus, video data with a frame rate exceeding the maximum frame rate parameter 306a for computer system 302a is incompatible with computer system 302a.

Server computer system 308 includes video data 324 which is recorded on a storage device of the server computer system, such as a fixed disk storage device. The video data 324 is encoded using a video encoding standard such as one of the Motion Picture Experts Group standards (MPEG) or QuickTime (MPEG is a registered trademark of the Motion Picture Experts Group, Inc and QuickTime is a registered trademark of Apple Computer Inc). The server computer system 308 further includes a streaming video server 312 which is a communications software module configured to send a data stream of the video data 324 for receipt by each of the client computers 302. The streaming video server 312 offers facilities for error, sequence and flow control to ensure the video data 324 arrives without error and in a correct sequence. For example, the streaming video server 312 is the Unreal Media Server developed by the Unreal Streaming Technologies group. The server computer system 308 also includes a server frame rate parameter 314 which is assigned a numeric value corresponding to a frame rate of the video data 324. The value of the server frame rate parameter 314 can be changed by the streaming video server configurator 316. The server computer system 308 also includes a client frame rate detector 318 which detects the maximum frame rate 306 of each of the client computer systems 302 and stores the maximum frame rates in a memory of the server computer system 308 as a copy of the client frame rates 320. For example, this detection can be achieved using an API, such as a TCP API, which requests that the streaming video server 312 sends a network message to the streaming video clients 304 requesting details of the client configurations 306. The streaming video clients 304 subsequently send details of the client configurations 306 to the streaming video server 312 over the TCP network connection 310. The copy of the client frame rates 320 is organised in a table data structure in the memory of the server computer system 308, and each frame rate in the copy of the client frame rates 320 includes an indicator of which of the clients 302a, 302b or 302c the frame rate corresponds to. Alternatively, the copy of the client frame rates 320 can be stored in a file, a database or in any other data structure in the memory of the server computer system 308. When the value of the server frame rate 314 is changed by the streaming video server configurator 316, a comparator 322 determines if each of the frame rates in the copy of the client frame rates 320 is compatible with the server frame rate 314. A client frame rate in the copy of the client frame rates 320 is considered incompatible if it has a numerical value which is lower than the server frame rate 314. If the comparator 322 determines that a client frame rate in the copy of the client frame rates 320 is incompatible with the changed server frame rate 314, the streaming video server 312 disconnects the client 302 corresponding to the incompatible frame rate.

In this way, changes to the server frame rate 314 result in the disconnection of only those client computer systems 302 with a maximum frame rate parameter 306 which is incompatible with the changed server frame rate 314.

Figure 4:
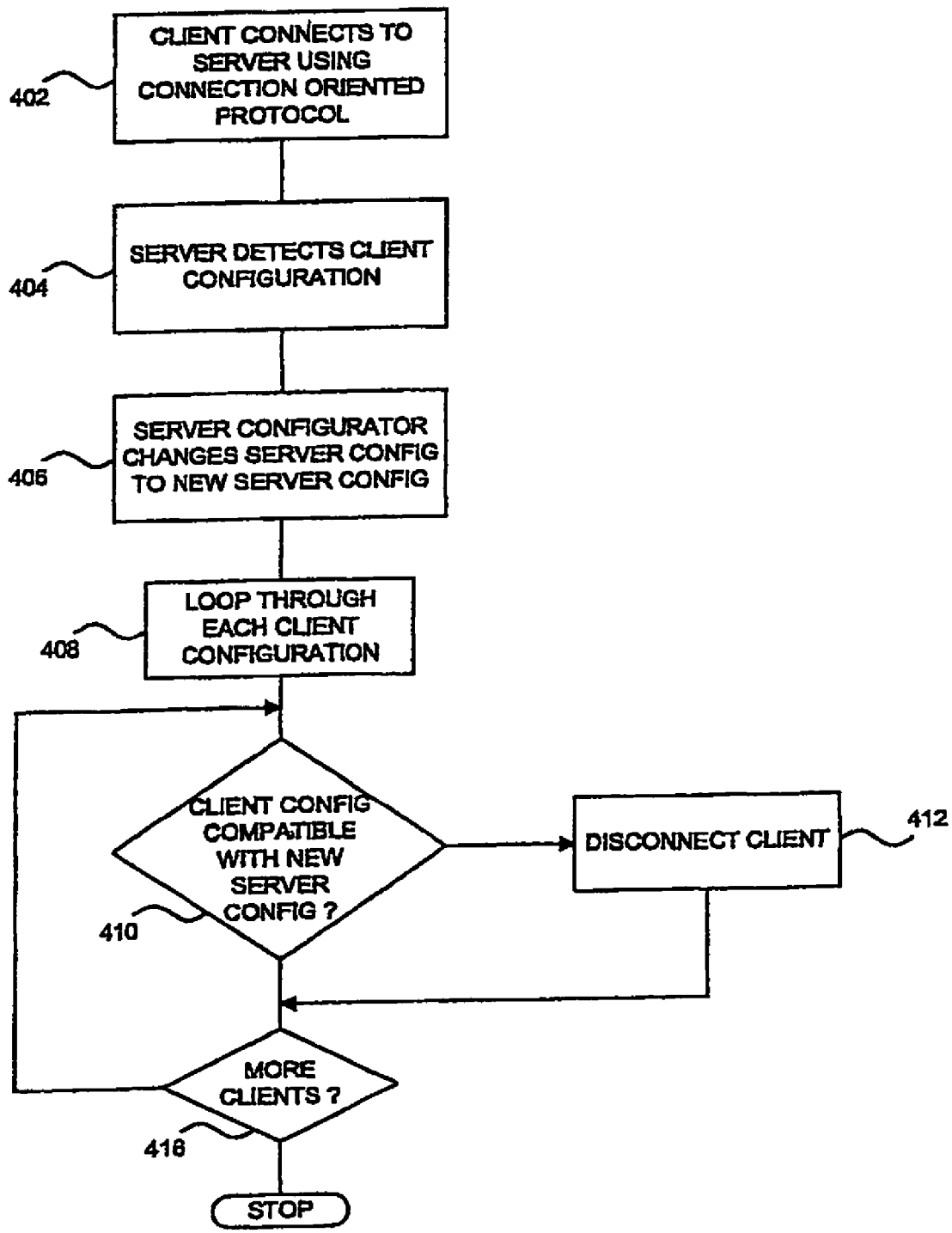
FIG. 4 is a flowchart illustrating a method of communication between a network client and a network server over a network in a preferred embodiment of the present invention.

FIG. 4 is a flowchart illustrating a method of communication between a network client and a network server over a network in a preferred embodiment of the present invention. The method of FIG. 4 will be explained with respect to the configuration of the client computer systems 302 and the server computer system 308 of FIG. 3. At step 402, the client computer systems 302 connect to the server computer system 308 using a connection-oriented protocol such as TCP. These connections can be made using the method to create a connection in the prior art described above with respect to FIG. 1. At step 404, the client frame rate detector 318 detects the maximum frame rate 306 of each of the clients 302 and generates a copy of the client frame rates 320 in the memory of the server computer system 308. Subsequently, at step 406, the streaming video server configurator 316 changes the value of the server frame rate 314 to a new value. At step 408 a loop is initiated through each client frame rate for each client computer system 302 in the copy of the client frame rates 320. At step 410, for each client frame rate for each client computer system 302 in the copy of the client frame rates 320, a determination is made by the comparator 322 as to whether the client frame rate satisfies the new value of the server frame rate 314. If the comparator 322 determines that the frame rate is not compatible with the new value of the server frame rate 314, the streaming video server 312 disconnects the client computer system 302 corresponding to the incompatible frame rate at step 412. Step 416 repeats the loop of step 408 until all frame rates in the copy of client frame rates 320 has been processed. In this way, changes to the server frame rate 314 result in the disconnection of only those client computer systems 302 with a maximum frame rate parameter 314 which is incompatible with the new value of the server frame rate 314. Consequently, those client computer systems 302 with a maximum frame rate parameter 306 which is compatible with the new value of the server frame rate parameter 306 continue to be connected to the server computer system 308.

The invention claimed is:

1. A method, in a network server, for network communication, the method comprising:

establishing connections between the network server and a plurality of network clients, wherein each connection is established using a connection-oriented protocol, wherein the network server has a first server configuration stored in a memory of the network server, wherein the first server configuration comprises a set of server parameters specific to a network application that the network server provides to the plurality of network clients, wherein each of the plurality of network clients has a corresponding client configuration stored in a memory of the corresponding network client, and wherein each client configuration comprises a set of client parameters specific to the network application for the corresponding network client;

storing a copy of each client configuration in a memory of the network server;

replacing the first server configuration with a second server configuration in the memory of the network server, wherein the second server configuration changes at least one server parameter specific to the network application;

responsive to replacing the first server configuration with the second server configuration, determining whether the client configuration of each of the plurality of network clients is incompatible with the second server configuration;

identifying a subset of the plurality of network clients that have a corresponding client configuration that is incompatible with the second server configuration;

disconnecting the subset of the plurality of network clients from the network server; and providing the network application to remaining network clients that are still connected to the network server using the connection-oriented protocol.

2. The method of claim 1, wherein the connection-oriented protocol is provided using a connectionless protocol.

3. The method of claim 1, wherein the client configuration, the first server configuration and the second server configuration include data compression parameters.

4. The method of claim 1, wherein the client configuration, the first server configuration and the second server configuration include data encryption parameters.

5. The method of claim 1, wherein the client configuration, the first server configuration and the second server configuration include signal strength parameters.

6. The method of claim 1, wherein the client configuration, the first server configuration and the second server configuration include data communication speed parameters.

7. The method of claim 1, wherein the client configuration, the first server configuration and the second server configuration include media encoding parameters.

8. The method of claim 1, wherein the client configuration, the first server configuration and the second server configuration include business application parameters.

9. A method, in a network server, for providing a streaming video application, the method comprising:

establishing connections between the network server and a plurality of network clients, wherein each connection is established using a connection-oriented protocol, wherein the network server has a first server configuration stored in a memory of the network server, wherein the first server configuration comprises a frame rate parameter specific to a streaming video application that the network server provides to the plurality of network clients;

detecting a corresponding client configuration for each of the plurality of network clients, wherein each client configuration comprises a maximum frame rate parameter specific to the streaming video application for the corresponding network client;

storing a copy of each client configuration in a memory of the network server;

replacing the first server configuration with a second server configuration in the memory of the network server, wherein the second server configuration changes the frame rate parameter specific to the streaming video application;

responsive to replacing the first server configuration with the second server configuration, determining whether the client configuration of each of the plurality of network clients is incompatible with the second server configuration;

identifying a subset of the plurality of network clients that have a corresponding client configuration that is incompatible with the second server configuration;

disconnecting the subset of the plurality of network clients from the network server; and providing the streaming video application to remaining network clients that are still connected to the network server using the connection-oriented protocol.

* * * * *